(12) United States Patent
Mazurenko et al.

(10) Patent No.: US 9,336,431 B2
(45) Date of Patent: May 10, 2016

(54) THREE-DIMENSIONAL REGION OF INTEREST TRACKING BASED ON KEY FRAME MATCHING

(71) Applicant: LSI Corporation, San Jose, CA (US)

(72) Inventors: Ivan Leonidovich Mazurenko, Khimki (RU); Alexander Alexandrovich Petyushko, Bryansk (RU); Denis Vladimirovich Parkhomenko, Mytyschy (RU); Alexander Borisovich Kholodenko, Moscow (RU); Dmitry Nicolaevich Babin, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 119 days.

(21) Appl. No.: 13/973,040

(22) Filed: Aug. 22, 2013

(65) Prior Publication Data

US 2014/0226854 A1 Aug. 14, 2014

(30) Foreign Application Priority Data

Feb. 13, 2013 (RU) .................................. 2013106357

(51) Int. Cl.
*G06K 9/00* (2006.01)
*G06T 7/20* (2006.01)
(52) U.S. Cl.
CPC ............ *G06K 9/00201* (2013.01); *G06T 7/204* (2013.01); *G06T 2207/10016* (2013.01); *G06T 2207/10028* (2013.01); *G06T 2207/30201* (2013.01)
(58) Field of Classification Search
CPC ............... G06K 9/00201; G06T 7/204; G06T 2207/30201
See application file for complete search history.

(56) References Cited

U.S. PATENT DOCUMENTS

| | | | | |
|---|---|---|---|---|
| 8,593,506 | B2 * | 11/2013 | Peleg et al. | 348/36 |
| 2006/0279453 | A1 * | 12/2006 | Caber | 342/97 |
| 2010/0150403 | A1 * | 6/2010 | Cavallaro et al. | 382/107 |
| 2012/0121128 | A1 * | 5/2012 | Lawrence et al. | 382/103 |
| 2013/0123801 | A1 * | 5/2013 | Umasuthan et al. | 606/130 |
| 2014/0168204 | A1 * | 6/2014 | Zhang et al. | 345/419 |
| 2014/0226854 | A1 * | 8/2014 | Mazurenko et al. | 382/103 |

FOREIGN PATENT DOCUMENTS

EP 2333721 6/2011

OTHER PUBLICATIONS

Zhang, Zhengyou, "Iterative Point Matching for Registration of Free-Form Curves"; Research Reports No. 1658, Program 4, Robotics, Vision and Image, National Institute for Research in Computer Science and Control; Mar. 1992, 45 pages.
Biber, Peter, "The Normal Distributions Transform: A New Approach to Laser Scan Matching"; WSI-Report Mar. 2003, 26 pages.
Kjer, Hans Martin, et al., "Evaluation of surface registration algorithms for PET motion correction", Bachelor thesis, Technical University of Denmark, Jun. 1, 2010, 97 pages.

* cited by examiner

*Primary Examiner* — Gregory M Desire
(74) *Attorney, Agent, or Firm* — Suiter Swantz pc llo

(57) ABSTRACT

A method and system for key frame based region of interest (ROI) tracking is disclosed. The method includes storing a key ROI set in a key ROI buffer, the key ROI set including at least one key ROI; designating one of the key ROI in the key ROI set as an active key ROI; receiving a point cloud representing a particular ROI to be processed for tracking; establishing a correspondence between that particular ROI and the active key ROI; determining whether to switch the active key designation to another key ROI in the key ROI set and switching the active key designation accordingly; and determining whether to modify the key ROI set and modifying the key ROI set accordingly.

20 Claims, 8 Drawing Sheets

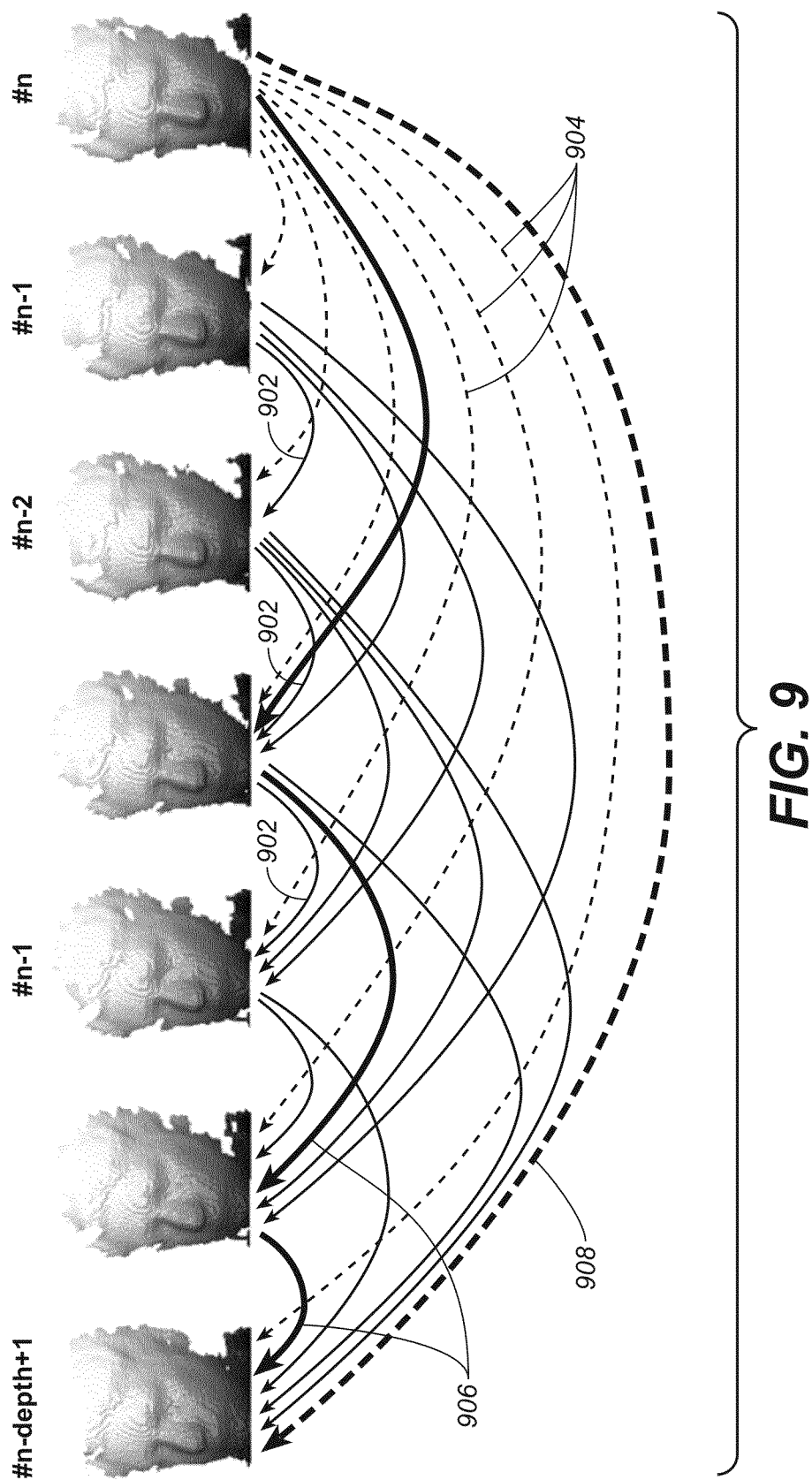

THREE-DIMENSIONAL REGION OF INTEREST TRACKING BASED ON KEY FRAME MATCHING

CROSS-REFERENCE TO RELATED APPLICATIONS

The present application claims priority based on Russian Application No. 2013106357 filed Feb. 13, 2013, the disclosure of which is hereby incorporated by reference in its entirety.

This application is related to co-pending and concurrently filed U.S. patent application Ser. No. 13/972,349, having LSI docket number L12-3262US1 and entitled "Feature Point Based Robust Three-Dimensional Rigid Body Registration" listing Dmitry N. Babin et al. as inventor, the entirety of which is incorporated herein by reference.

TECHNICAL FIELD

The present invention relates to the field of image processing and particularly to systems and methods for three-dimensional region of interest tracking.

BACKGROUND

A Region of Interest, also referred to as ROI, is a selected subset of samples within a dataset identified for a particular purpose. ROI tracking is a process of detecting a ROI throughout a sequence of image frames (e.g., a video) as it moves and deforms.

SUMMARY

Accordingly, an embodiment of the present disclosure is directed to a method for ROI tracking. The method includes storing a key ROI set in a key ROI buffer, the key ROI set including at least one key ROI; designating one of the key ROI in the key ROI set as an active key ROI; receiving a point cloud representing a particular ROI to be processed for tracking; establishing a correspondence between that particular ROI and the active key ROI; determining whether to switch the active key designation to another key ROI in the key ROI set and switching the active key designation accordingly; and determining whether to modify the key ROI set and modifying the key ROI set accordingly.

A further embodiment of the present disclosure is directed to a method for ROI tracking. The method includes initializing a key ROI buffer for storing a key ROI set having a plurality of key ROIs and a plurality of isometric transformations established between the plurality of key ROIs; designating one of the key ROI in the key ROI set as an active key ROI; receiving a point cloud representing a particular ROI to be processed for tracking; establishing a correspondence between that particular ROI and the active key ROI; calculating a cloud-to-cloud distance between that particular ROI and the active key ROI; determining whether another key ROI in the key ROI set has a shorter could-to-cloud distance to that particular ROI; switching the active key designation to this other key ROI in the key ROI set when this other key ROI has a shorter could-to-cloud distance to the particular ROI; and determining whether to modify the key ROI set and modifying the key ROI set accordingly.

An additional embodiment of the present disclosure is directed to a system for ROI tracking. The system includes a key ROI buffer configured for storing a key ROI set having a plurality of key ROIs and a plurality of isometric transformations established between the plurality of key ROIs. The system also includes a ROI tracking module communicatively coupled with the key ROI buffer. The ROI tracking module is configured for: designating one of the key ROI in the key ROI set as an active key ROI; receiving a point cloud representing a particular ROI to be processed for tracking; establishing a correspondence between that particular ROI and the active key ROI; calculating a cloud-to-cloud distance between that particular ROI and the active key ROI; determining whether another key ROI in the key ROI set has a shorter could-to-cloud distance to that particular ROI; switching the active key designation to this other key ROI in the key ROI set when this other key ROI has a shorter could-to-cloud distance to the particular ROI; and determining whether to modify the key ROI set and modifying the key ROI set accordingly.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 9 is an illustration depicting an exemplary result of the Viterbi-like procedure of FIG. 8.

DETAILED DESCRIPTION

Reference will now be made in detail to the presently preferred embodiments of the invention, examples of which are illustrated in the accompanying drawings.

The present disclosure is directed to a method and system for solid/rigid object tracking. More specifically, the method tracks the three-dimensional (3D) position of a rigid object captured in a series of images received from a 3D-camera (e.g., a time-of-flight camera, a structured light imaging device, a stereoscopic device or other 3D imaging devices). It is contemplated that each 3D image of the image series, upon certain image processing and coordinate transformations, provides a finite set of points (hereinafter referred to as a point cloud) in a Cartesian coordinate system that represents the surface of that rigid object. If the rigid object captured on this series of images moves over time, the method in accordance with the present disclosure is configured to detect and track its movement.

Instead of utilizing a model-based tracking process, the method in accordance with the present disclosure stores images of a plurality of predefined regions of interest (ROIs), which are referred to as "key ROIs", and dynamically rebuilds a graph of key ROIs and switches between key ROIs to track the object. In addition, each current ROI can be effectively matched with an active key ROI by using Viterbi-like sub-optimal path in the graph of ROIs, allowing the method to be used effectively for ROI tracking, gesture recognition, as well as other image processing related applications.

Figure 1:
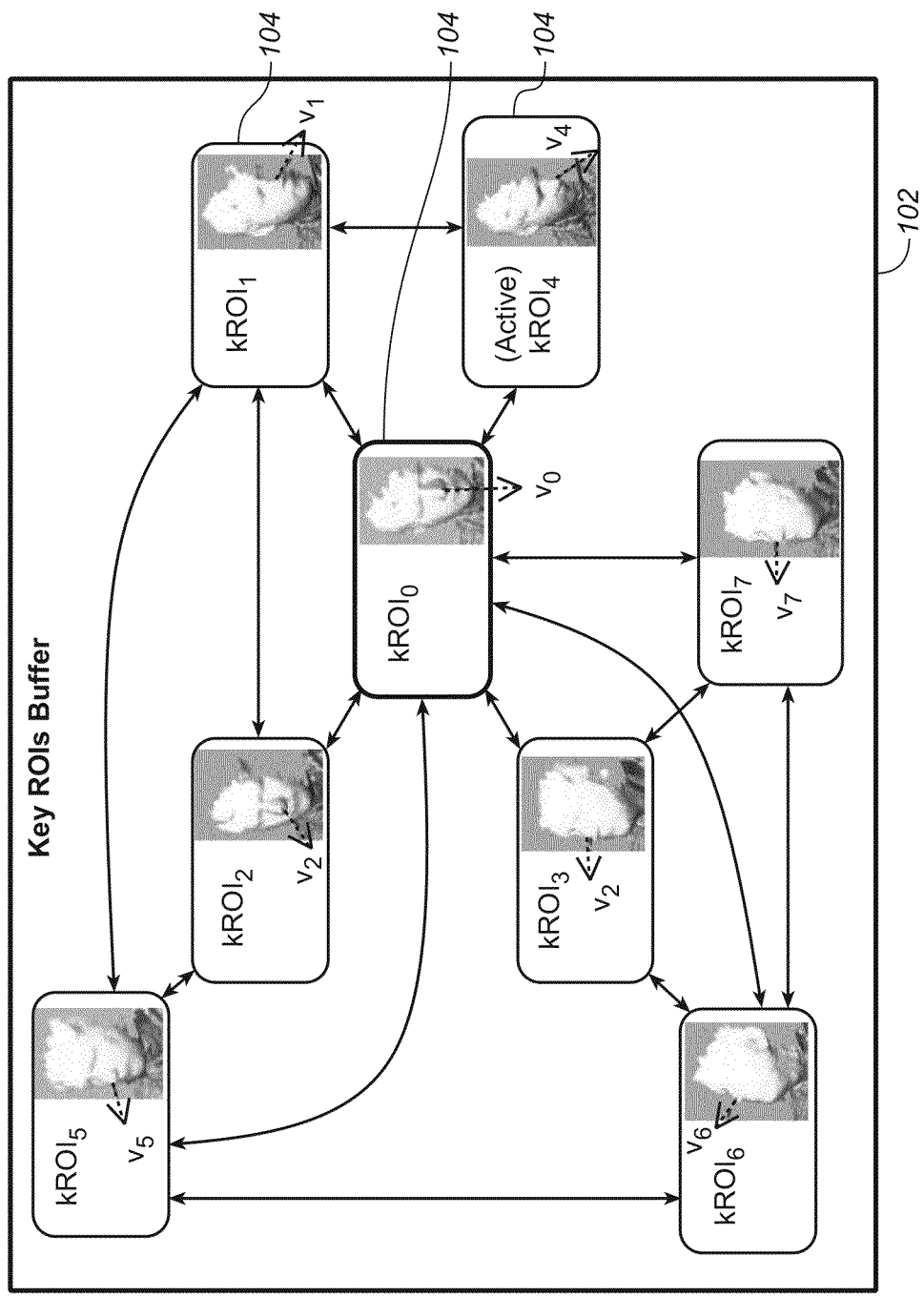
FIG. 1 is an illustration depicting a plurality of predefined regions of interests (ROIs)

In one embodiment, as illustrated in FIG. 1, the images of the plurality of predefined ROIs, i.e., the key ROIs, are stored and managed in a memory space referred to as key ROI buffer 102. In the simplest case, for illustrative purposes, the key ROI buffer 102 includes a single ROI, which can be predefined or selected during a training stage. However, the number of key ROIs being managed is not limited to one. A more generic key ROI buffer with more than one key ROI 104 is illustrated in FIG. 1, and details of which will be described later.

To define the steps of key ROIs management and tracking blocks in a formal manner, the following notations are introduced. First, let us formally define ROI. Let n denote the index of a frame (here n also corresponds to time axis value as image frames are received from the 3D-camera sequentially with respect to time). A point cloud is a set of 3D points $\{p_1, \ldots, p_N\}$ where N is the number of points in the set and $p_i=(x_i, y_i, z_i)$ is a triple of 3D coordinates of the i-th point in the set. For each 3D image received, the image can be pre-processed to provide a set of 3D point clouds, or ROIs, as output: $(ROI_1(n), ROI_2(n), \ldots, ROI_K(n))$ where K is the number of ROIs to be tracked for each frame and n is the index of the current frame.

For illustrative purposes, let K=1 and only one ROI is considered per frame, in which case ROI(n) denotes the ROI for frame n. For instance, if the 3D-camera captures the entire body of a person, but only the head position of the person is of a particular interest, in which case ROI(n) generated for each frame is the 3D point could of the head. It is contemplated, however, that more than one ROI can be taken into consideration per frame. For instance, if we are interested in tracking not only the movement of one person's head, but also movements of multiple heads in a scene simultaneously, then more than one ROI can be generated for each frame. In such cases, i.e., K>1, the processing steps described below will be the same but iterated through $ROI_i(n)$, i=1 ... k for each frame n. However, as stated above, for illustrative purposes, the value of K is assumed to be 1.

Now let Nkey_max denote the maximal size of the key ROI buffer 102. It is noted that while the illustration shown in FIG. 2 has Nkey_max=1, the value of Nkey_max is greater than or equal to one in general cases. Also let Nkey≤Nkey_max denotes the actual key ROIs buffer size, we have keys= $(kROI_0, kROI_1, \ldots, kROI_{Nkey-1},)$ where a prefix "k" is used to identify that ROI being a key ROI. Furthermore, let index ikey, 0≤ikey<Nkey, denote the index of the "active" ROI (the term active ROI will be further described below). At each time moment n, one and only one key ROI is set to be the active ROI.

Let us also define a transformation denoted as (A, d). That is, for two point clouds $C_1$ and $C_2$, there exists an isometric transformation matching the first cloud $C_1$ to the second cloud $C_2$ if a pair (A, d) is defined where A is a 3×3 real rotation matrix and d is a real translation vector of length 3. More specifically, for some pair of key ROIs with indexes i and j, 0≤i, j<Nkey, an isometric transformation $(A_{ij}, d_{ij})$ is defined between $kROI_i$ and $kROI_j$ and such information is recorded in the key ROI buffer memory. For illustrative purposes relating to FIG. 1, each established transformation $(A_{ij}, d_{ij})$ between $kROI_i$ and $kROI_j$ is represented as a path connecting the key ROIs $kROI_i$ and $kROI_j$.

Furthermore, a cloud-to-cloud distance metric ρ is defined so that the value of $\rho(A \times C_1 + d, C_2)$ shows how well the isometric transformation (A, d) fits the correspondence matching between $C_1$ and $C_2$. For instance, the cloud-to-cloud distance metric may be defined similar to the distance metric described in: Evaluation of surface registration algorithms for PET motion correction, Hans Martin Kjer et al., Bachelor Thesis, Technical University of Denmark, 2012. It is contemplated, however, that various other techniques may be utilized to define cloud-to-cloud distance metric without departing from the spirit and scope of the present disclosure.

In accordance with one embodiment of the present disclosure, one of the key ROIs is designated as the "main" key ROI. In the illustration depicted in FIG. 1, $kROI_0$ is the designated main key ROI. For each key ROI with index i, 0≤i<Nkey, there exists a chain of ROIs with indexes $0, i_1, i_2, \ldots, i$ having a length of a chain not greater than a predefined constant Nchain≥1 so that $(A_{ij}, d_{ij})$ is defined for each pair of adjacent ROIs in this chain. In this case Nchain is a maximal graph distance to the main key ROI $kROI_0$. The fact that any key ROI is connected to $kROI_0$ by some path in this ROI graph leads to the fact that any two key ROIs have a path connecting them with a length not greater than Nchain×2.

Figure 2:
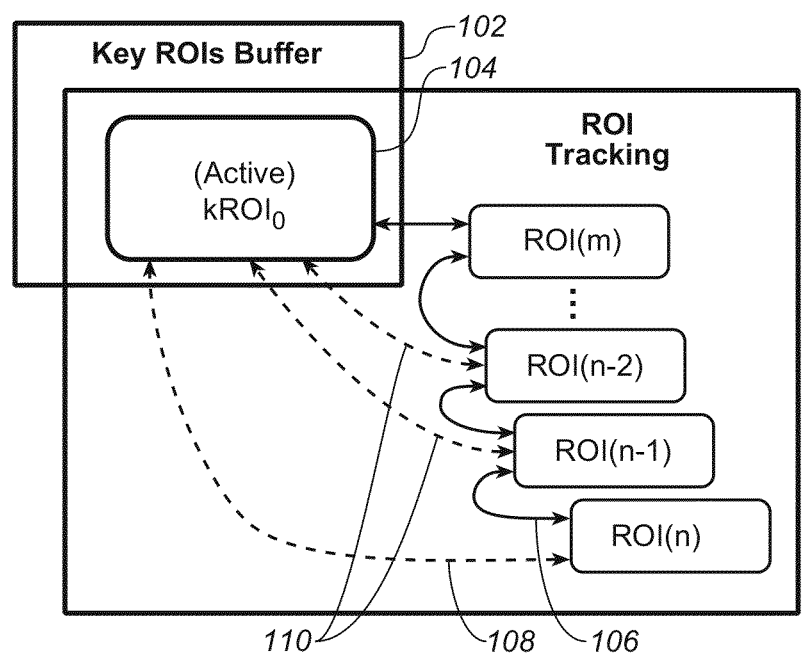
FIG. 2 is an illustration depicting ROI tracking utilizing a key ROI buffer with a single key ROI.
Figure 3:
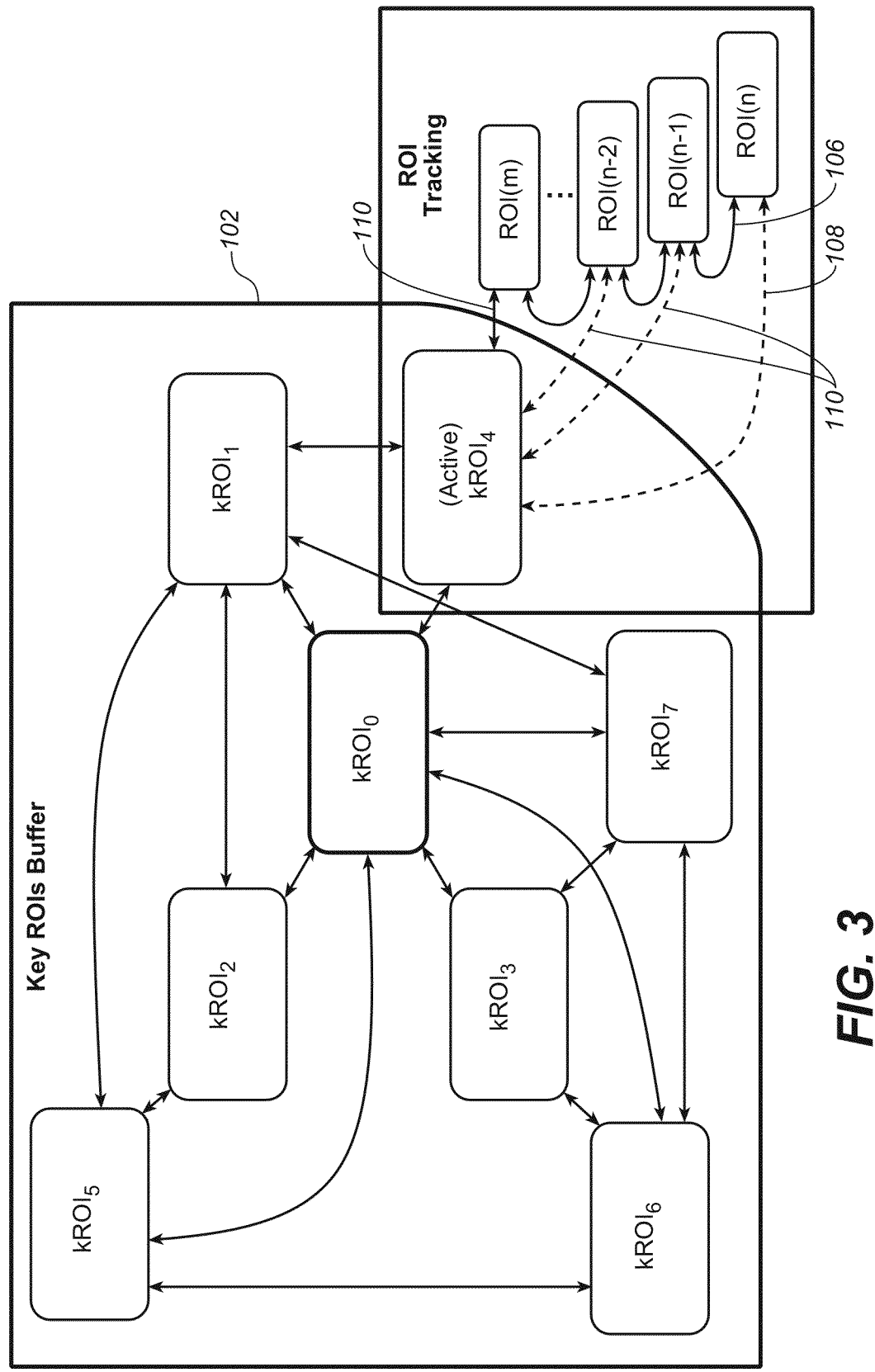
FIG. 3 is an illustration depicting ROI tracking utilizing a key ROI buffer with multiple key ROIs.

Referring to the key ROI graph depicted in FIG. 2, Nkey=1, Nkey_max=1, Nchain=1 and ikey=0. In this case, one key ROI 104 is stored in the key ROI buffer 102 and it is always active. It is contemplated that in one embodiment this key ROI 104 is predefined at configuration time (e.g., as a part of gesture recognition application configuration). Alternatively, this key ROI is determined as a result of a training procedure (e.g., a user may be asked to put his/her body in certain position and the ROI from this user frame is taken as the key ROI). Furthermore, in other embodiments, the key ROI can be updated from time to time, and the procedure for making such updates is provided below for a general use case with Nkey_max>1. For instance, in the key ROI graph depicted in FIG. 3, Nkey=8, Nchain=2 and ikey=4. This illustration corresponds to a general use case with more than one key ROI in a key ROI buffer 102.

Figure 4:
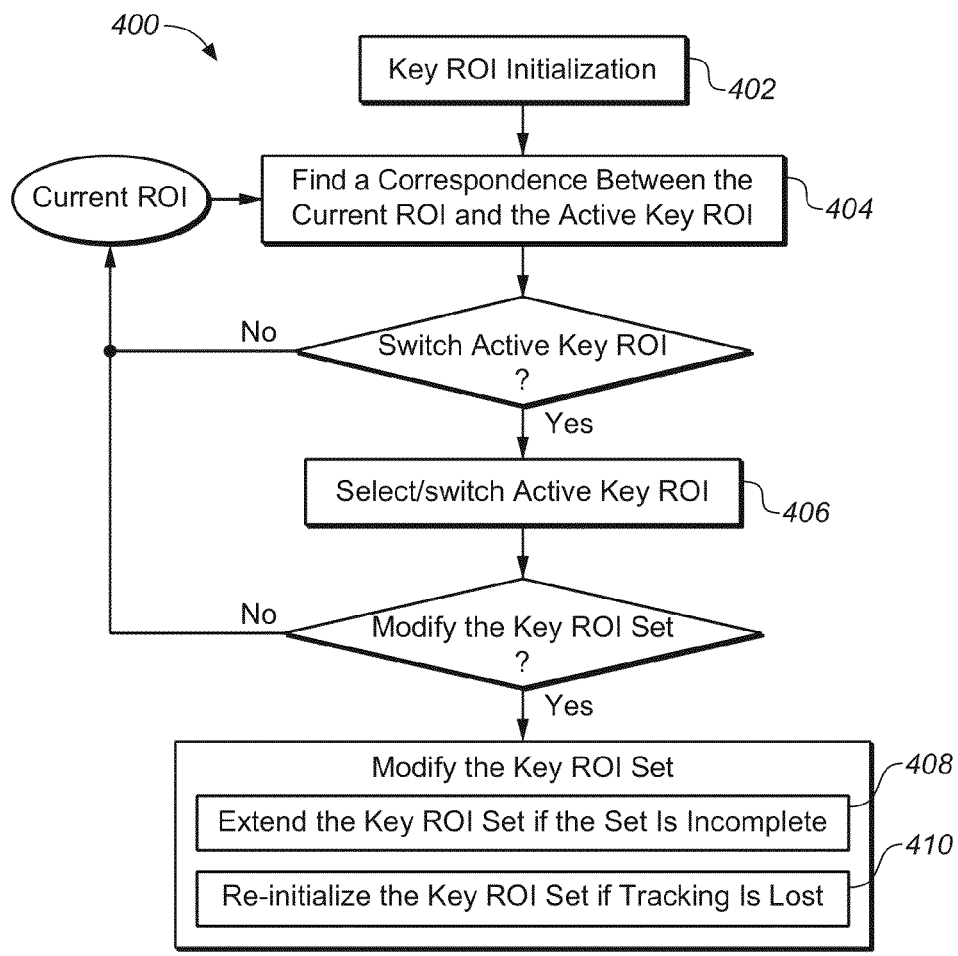
FIG. 4 is a flow diagram illustrating a key ROI graph based tracking method.

Referring now to FIG. 4, the key ROI graph based tracking method 400 in accordance with the present disclosure is shown.

Step 402 first initializes the tracking process. In one embodiment, the first key ROI is selected and set to the active state, i.e., ikey:=0. Step 404 then provides ROI tracking by finding an optimal or sub-optimal correspondence between ROI(n) (i.e., the ROI on the current image frame being processed) and the active key ROI $kROI_{ikey}$ stored in the key ROI buffer 102. The correspondence is found in the form of isometric transformation (A, d) defined above. That is, for a given ROI(n), step 404 establishes a transformation (A, d) that best matches ROI(n) to $kROI_{ikey}$, and this transformation in turn provides ROI tracking.

Figure 5:
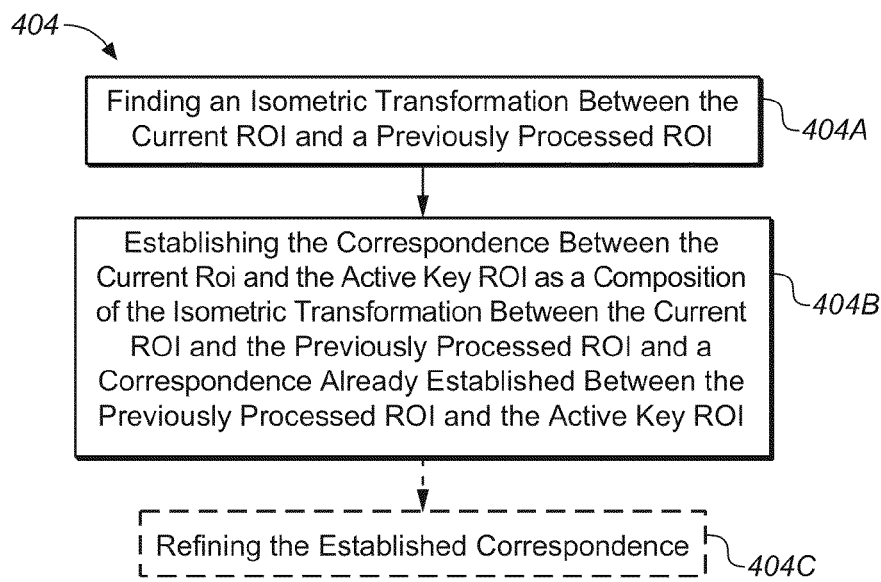
FIG. 5 is a flow diagram illustrating a method for finding an isometric transformation between the current ROI being processed and the active key ROI stored in the key ROI buffer.

FIG. 5 is a flow diagram illustrating the process performed by step 404 for finding the best isometric transformation between two point clouds denoted as ROI(n) (i.e., the current ROI) and $kROI_{ikey}$ (i.e., the active key ROI) in accordance with one embodiment.

More specifically, step 404A finds an optimal isometric transformation $(A_{n,n-1}, d_{n,n-1})$ between the ROI of the current frame ROI(n) and the ROI of the previous frame ROI(n−1). This transformation is indicated as path 106 in the illustrations depicted in FIGS. 2 and 3. It is contemplated that various techniques may be utilized to find such an isometric transformation. For instance, the technique described in: Iterative point matching for registration of free-form curves and surfaces, Zhengyou Zhang, International Journal of Computer Vision 13 (12): 119-152 (1994), which is herein incorporated by reference in its entirety, can be utilized. Alternatively, the technique described in: The normal distributions transform: A new approach to laser scan matching, P. Biber et al, in Proc. International Conference on Intelligent Robots and Systems (2003), which is herein incorporated by reference in its entirety, can also be utilized.

Step 404B is utilized to find the optimal correspondence (A, d) between ROI(n) and $kROI_{ikey}$ as a composition of $(A_{n,n-1}, d_{n,n-1})$, $(A_{n-1,n-2}, d_{n-1,n-2})$, ... $(A_{n-m+1,n-m}, d_{n-m+1,n-m})$ and $(A_{n-m,ikey}, d_{n-m,ikey})$ where the last transformation matches ROI(n−m) to $kROI_{ikey}$. It is contemplated that similar techniques utilized in step 404A can be utilized in 404B for finding such transformations. The transformations found in step 404B are indicated as paths 110 in the illustrations depicted in FIGS. 2 and 3, and they in turn can be used to track movements of the ROI from one frame to another.

It is also contemplated that an optional step 404C can be utilized to refine the transformations found in steps 404A and 404B. More specifically, step 404C is configured to:
1) Find (A', d') that best matches A×ROI(n)+d and $kROI_{ikey}$;
2) Calculate a composition (A", d")=(A'×A, A'×d+d') based on (A', d') and (A, d); and
3) If $\rho(A"\times ROI(n)+d", kROI_{ikey}) < \rho(A\times ROI(n)+d, kROI_{ikey})$, replace (A, d) with (A", d").

In this manner, if a transformation exists that matches ROI(n) more closely to $kROI_{ikey}$, such a transformation is considered a refined transformation (indicated as path 108 in FIGS. 2 and 3 for illustrative purposes) to replace the previously established transformation 106. Similarly, this refinement process can be applied to each of ROI(n−1) through ROI(n−m+1) and if a refined transformation exists, the refined transformation is used as the replacement.

It is contemplated that regardless of whether the optional step 404C is performed, the purpose of step 404 is to establish a transformation between the current ROI(n) and the active $kROI_{ikey}$. By establishing such a transformation, the current ROI(n) is either directly or indirectly connected to one of the key ROIs, and tracking of this current ROI(n) is in turn established, which can be used for applications such as gesture recognition and the like.

It is contemplated that the active key ROI $kROI_{ikey}$ is not limited to $kROI_0$ as established when the method was first initialized. As the method progresses, the active key ROI $kROI_{ikey}$ needs to be switched conditionally based on the image frames being processed. Therefore, step 406 is configured to conditionally select an active key ROI from the key ROI buffer 102.

In one embodiment, step 406 conditionally selects an active key ROI utilizing the cloud-to-cloud distance metric ρ described above. More specifically, the following process is used for selecting the active key ROI:

1) Find $(A_{ikey}, d_{ikey})$ as the best isometric transform that matches ROI(n) to $kROI_{ikey}$ found at step 404, and calculate the distance metric $dr_{ikey}=\rho(A_{ikey}\times ROI(n)+d_{ikey}, kROI_{ikey})$; and 2) For each i=0 ... Nkey−1, i≠ikey, estimate $dr_i=\rho(A_i\times ROI(n)+d_i, kROI_i)$, where $(A_i, d_i)$ is obtained by applying step 404 to ROI(n) and $kROI_i$. If for some i, $dr_i \leq dr_{ikey}-\delta$ where δ is a predefined small non-negative constant and i=argmin($dr_i$), we consider i as an index of the new active key ROI so that ikey:=i.

It is contemplated that the specific value of δ used in this process can be predetermined based on various design factors. In the simplest case δ=0, but this can lead to frequent active key frame switching in cases when $dr_i$ is close to $dr_{ikey}$. It is also contemplated that while the process described above works well for selecting/switching active key ROIs, the complexity associated with calculating the distance metric ρ can be further reduced. For instance, one embodiment of the present disclosure utilizes an alternative procedure for key ROI switching described as follows.

In this alternative procedure, let us assign one to three baseline vectors from the set {(1,0,0), (0,1,0), (0,0,1)} to the main key ROI $kROI_0$. For each of the key ROIs $kROI_i$ with index i, the baseline vectors assigned to this key ROI is set to A×v+d where (A, d) is an isometric transformation that matches $kROI_i$ to some other key ROI with baseline vector v. We can also assign baseline vector v(n) to the current ROI(n) as $A_{ikey}\times v_{ikey}+d_{ikey}$ where $v_{ikey}$ is a baseline vector for the active key ROI $kROI_{ikey}$.

We can then define a value dist(v(n), $v_i$) for $kROI_i$ where $v_i$ is the corresponding baseline vector assigned to $kROI_i$ and dist stands for the distance metrics between vectors in three-dimensional real space (e.g., Euclidian space or the like). In case if more than 1 (i.e., 2 or 3) baseline vectors are assigned to each key ROI, maximal value of corresponding distances dist(v(n), $v_i$) is selected. The new active key ROI index can now be selected based on the definitions presented above. More specifically, in one particular embodiment, the index identifying the new active key ROI is selected as ikey:=argmin(dist(v(n), $v_i$), i=0 ... Nkey−1).

It is contemplated that the two procedures for selecting/switching active key ROIs described above are merely exemplary for illustrative purposes. Furthermore, the distance metrics utilized in such procedures may vary without departing from the scope and spirit of the present disclosure. Regardless of the particular procedure utilized for selecting/switching active key ROIs, the purpose of step 406 is to identify one key ROI, among the set of key ROIs, that is the closest to the current ROI. And if the key ROI identified is not the active key ROI, the role of the active key ROI is switched to the key ROI identified.

It is also contemplated that the set of key ROIs is dynamically modifiable. The purpose of modifying the set of key ROIs is to keep the key ROIs relevant to the incoming frame currently being processed. For instance, step 408 is utilized to determine whether the set of key ROIs needs to be extended. More specifically, if for each key ROI i, 0≤i<Nkey, dist(v(n), $v_i$)>dist_max but $dr_i \leq$ d_max, the set of key ROIs is deemed incomplete and needs to be extended.

The following process is utilized in one embodiment to extend the set of key ROIs, when deemed necessary:
1) Add the current ROI ROI(n) to the set of key frames;
2) If the chain length between $kROI_{ikey}$ and $kROI_0$ is greater than or equal to Nchain, the process goes directly to step 410. Otherwise, add the isometric correspondence between ROI(n) and $kROI_{ikey}$ as a new path to the graph;
3) Set the active key ROI index to the index of the newly added ROI ROI(n); and
4) If Nkey is equal to Nkey_max (i.e. the set has reached the maximal number of key ROIs allowed), remove one of the old key ROIs from the key ROIs buffer.

It is contemplated that various techniques can be utilized to remove one of the key ROIs from the key ROIs buffer. In one embodiment, a key ROI having the maximal distance $dr_i$ to ROI(n) is identified as the ROI to be removed. In an alternative embodiment, each key ROI has a special usage counter initially set to zero so that the counter is increased each time the key ROI is used. In this manner, the least frequently used key ROI is considered as the candidate to be removed from the buffer. It is understood that other buffer replacement techniques may also be utilized without departing from the spirit and scope of the present disclosure.

It is also contemplated that while searching for the candidate ROI to be removed using either of these methods, the following two additional considerations need to be taken into account so that the key ROI is removed only if it meets these limitations:
1) i≠0, i.e., the main frame cannot be removed; and
2) Removing $kROI_i$ from the set of key ROIs does not break the connectivity of the key ROIs graph.

It is further contemplated that in certain situations tracking of the current ROI(n) is considered lost. More specifically, as stated in step 408 above, if for each key ROI i, 0≤i<Nkey, dist(v(n), $v_i$)>dist_max but $dr_i$≤d_max, and if the chain length between $kROI_{ikey}$ and $kROI_0$ is greater than or equal to Nchain, the tracking of the current ROI(n) is considered lost, and step 410 needs to initiate a tracking re-initialization process. In such cases, a transformation that matches ROI(n) and one of the other key ROIs (having the chain length less than Nchain) needs to be established. It is contemplated that various point cloud registration techniques, including the ones based on feature point registration can be utilized to find a transformation that matches ROI(n) and one of the other key ROIs. For instance, the technique described in a co-pending application: Feature Point Based Robust Three-Dimensional Rigid Body Registration, listing Dmitry N. Babin et al. as inventor, is utilized in one embodiment for such purposes. That is, the registration technique is performed to match the current ROI ROI(n) against each of the key ROI in the set of key ROIs. A particular key ROI from the set of key ROIs that provides the optimal feature point registration is then selected for tracking re-initialization.

More specifically, let j be the index of the selected key ROI and (A, d) be the corresponding transformation that matches ROI(n) to $kROI_j$. The following process is utilized in one embodiment to re-initialize the tracking process:
1) Add the current ROI ROI(n) to the set of key frames;
2) Add the transformation (A, d) between ROI(n) and $kROI_j$ as a new path to the graph;
3) Set the active key ROI index to the index of the newly added ROI ROI(n); and
4) If Nkey is equal to Nkey_max (i.e. the set has reached the maximal number of key ROIs allowed), remove one of the old key ROIs from the key ROIs buffer similar to the removal process described above.

Based on the steps described above, the key ROI tracking method 400 in accordance with the present disclosure can be utilized for tracking each incoming ROI by matching it against the active key ROI and managing the key ROI buffer accordingly.

Figure 6:
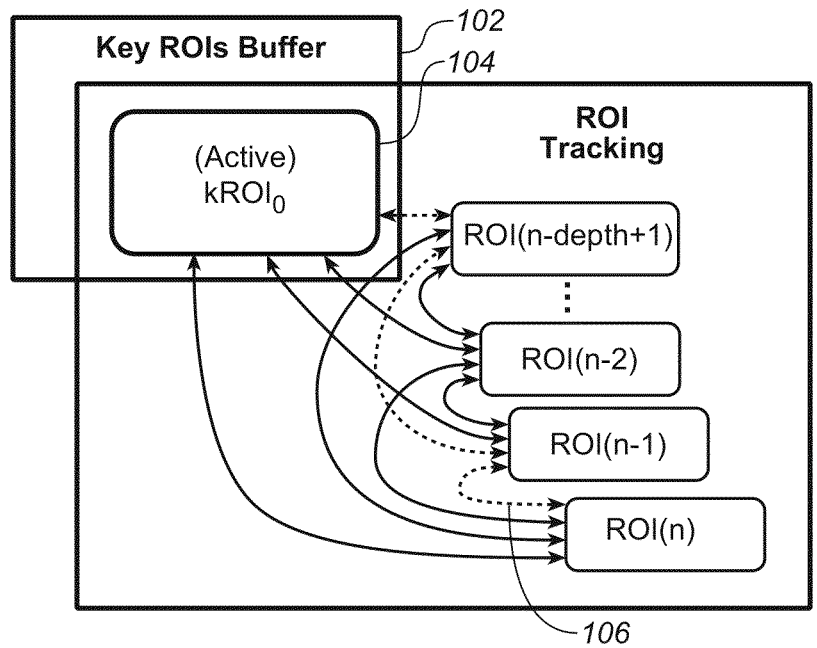
FIG. 6 is an illustration depicting ROI tracking utilizing a key ROI buffer with a single key ROI, wherein the isometric transformation between the current ROI being processed and the active key ROI is determined utilizing a Viterbi-like procedure.
Figure 7:
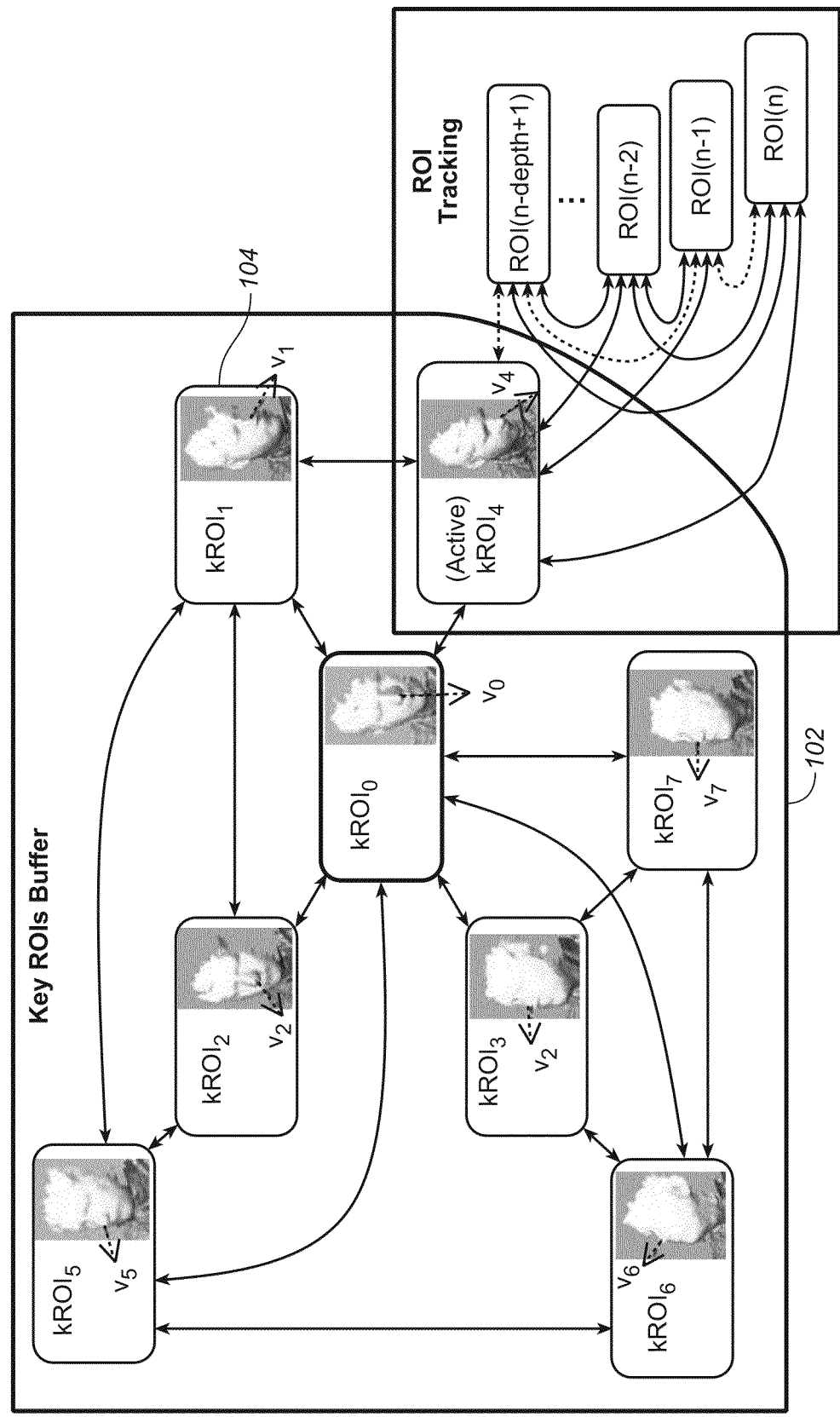
FIG. 7 is an illustration depicting ROI tracking utilizing a key ROI buffer with multiple key ROIs, wherein the isometric transformation between the current ROI being processed and the active key ROI is determined utilizing a Viterbi-like procedure.

It is contemplated that the process of finding the best isometric transformation between ROI(n) and $kROI_{ikey}$ is not limited to that described in FIG. 5. In an alternative embodiment, a Viterbi-like procedure in accordance with the present disclosure is utilized for finding the best match between the current ROI(n) and a set of previous ROIs. More formally, let us set a Viterbi depth parameter, depth=2,3 . . . so that depth=2 corresponds to the trivial use case when no optimal path is needed to be searched for. The ROI graphs depicted in FIGS. 6 and 7 are labeled with the Viterbi depth parameter for illustrative purposes.

Figure 8:
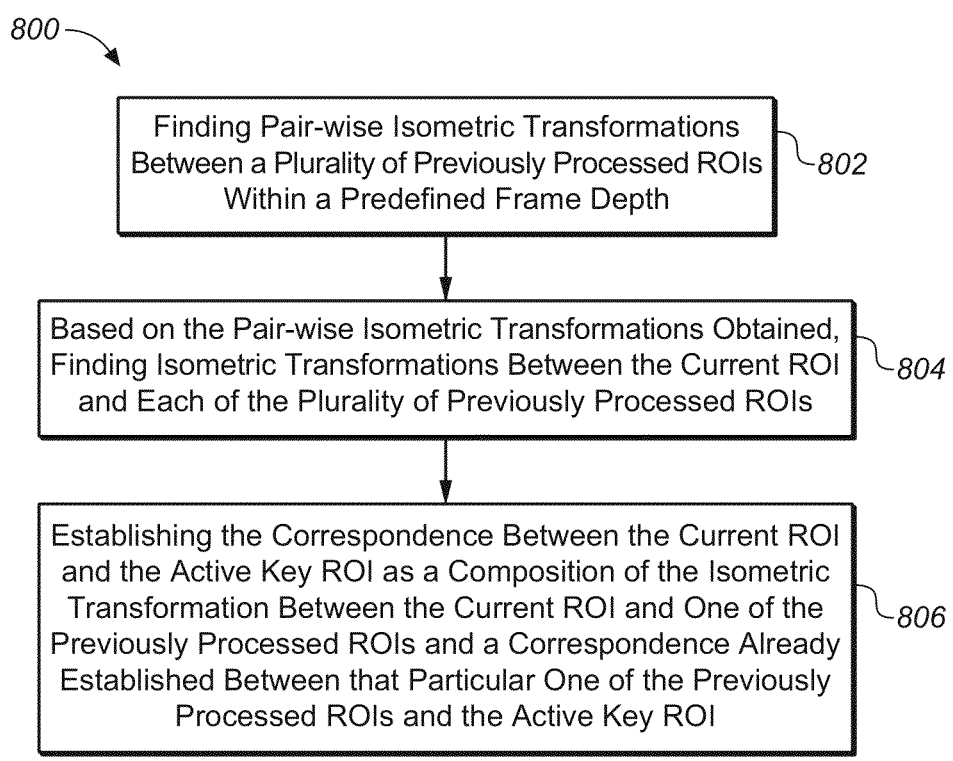
FIG. 8 is a flow diagram illustrating the Viterbi-like procedure for finding an isometric transformation between the current ROI being processed and the active key ROI stored in the key ROI buffer.

Accordingly, as illustrated in FIG. 8, the Viterbi-like procedure 800 for finding the best orthogonal transform between ROI(n) and ROI(m), where |n−m|<depth, includes of the following steps.

Step 802 obtains the best isometric transformation ($A_{ij}$, $d_{ij}$) that matches ROI(n−i) and ROI(n−j), i,j=1,2, . . . depth. In case the procedure just started, all these transformations can be initialized to (E, e) where E is an identity matrix and e is a zero (0,0,0) vector, and for any i, ($A_{ii}$, $d_{ii}$)=(E, e). Step 804 then finds ($A'_i$, $d'_i$) as the best transformation matching ROI (n) with ROI(n−i−1), i=0 . . . depth−2 using any conventional methods available. Step 806 is defined as an induction step, which is used to find a new ($A_{0i}$, $d_{0i}$) that best matches ROI(n) and ROI(n−i), i=1, 2, . . . depth−1, as the best (in terms of distance metric ρ) of the following transformations: ($A'_i$, $d'_i$) and ($A_{ij}$, $d_{ij}$)×($A'_j$, $d'_j$), j=1, 2, . . . , depth−1, each with the option to apply the refinement procedure described in step 404C above.

FIG. 9 is an illustration depicting the result of the optimal path search procedure 800 described above. In this exemplary illustration, the isometric transformations ($A_{ij}$, $d_{ij}$) obtained in step 802 are indicated as paths 902, the transformations ($A'_i$, $d'_i$) obtained in step 804 are indicated as paths 904, and the optimal transformations ($A_{0i}$, $d_{0i}$) obtained in step 806 are indicated as paths 906, which form a sequence of paths to create the optimal path from #n to #n−depth+1 as indicated in the figure. Path 908 is presented to indicate the optimal transformation that can be obtained if the optional refinement procedure is taken. It is noted that the paths depicted in FIG. 9 are merely used to illustrate the relationship between the paths obtained and their corresponding steps described in procedure 800. The actual optimal transformations obtained may differ from this illustration without departing from the scope and spirit of the present disclosure.

Figure 10:
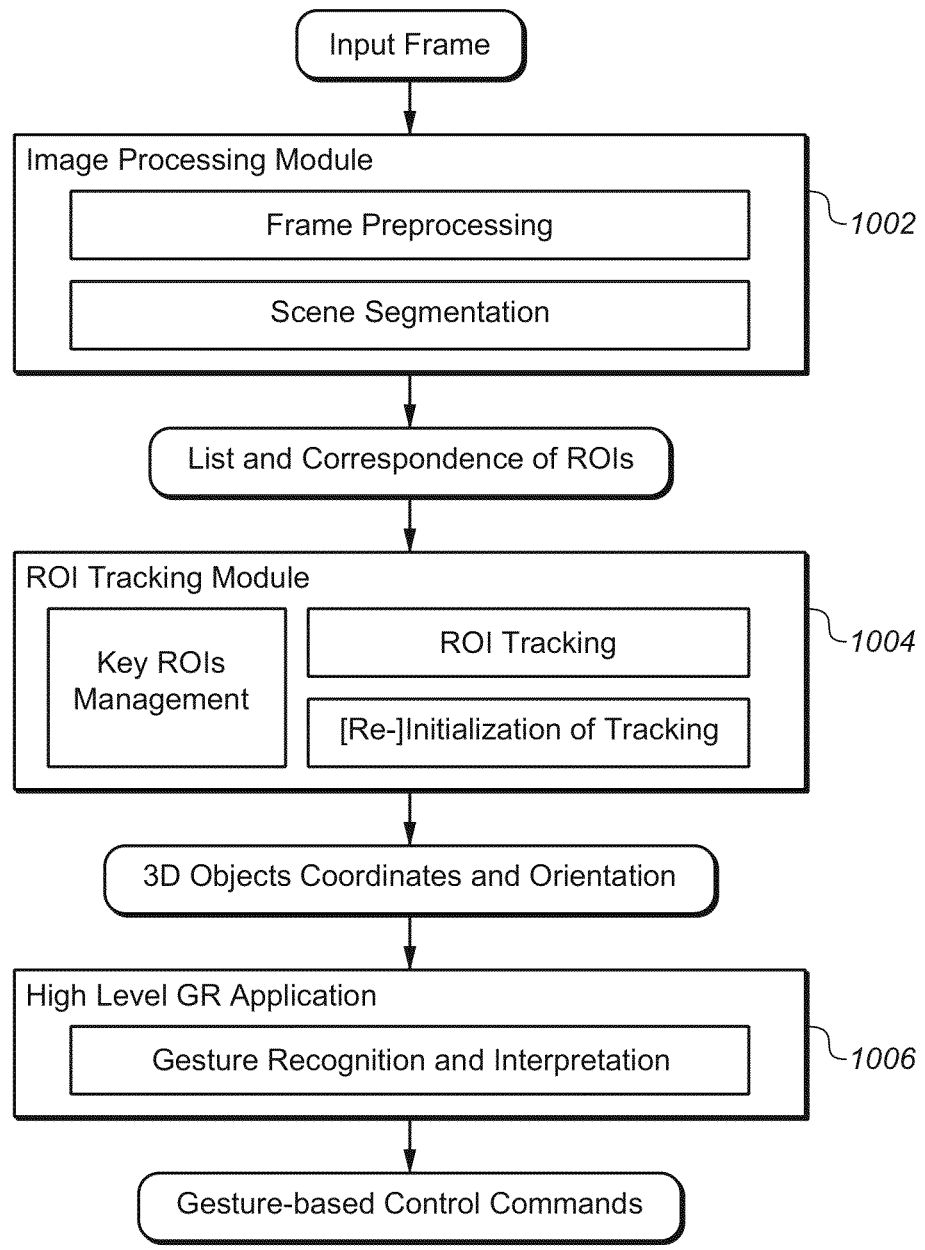
FIG. 10 is a block diagram depicting architecture of a gesture recognition system utilizing the key ROI graph based tracking method.

It is contemplated that the ROI tracking method in accordance of the present disclosure can be used effectively for various image processing related applications such as gesture recognition and the like. FIG. 10 is a block diagram showing architecture of a gesture recognition system utilizing the ROI tracking method described above. More specifically, the image frames from one or more imagers/cameras are received and processed at the data processing module 1002. In certain embodiment, each image frame is further processed using a scene segmentation block and the output of which is a list and inter-frame correspondence between various regions of interests. As previously stated, each ROI corresponds to some rigid objects to be tracked. Examples of such rigid object for the purpose of gesture recognition include, but are not limited to, a head, parts or the entirety of a hand, as well as other regions of interests that need to be tracked.

The list of ROIs generated by the data processing module 1002 is then provided to the ROI tracking module 1004. The ROI tracking module 1004 provides ROI tracking based on managing the key ROI buffer as described above. It includes finding a correspondence between ROIs in a form of isometric transformation, managing the set of key ROIs, updating the correspondence between key ROIs and switching the index of the active key ROI if necessary. In addition, a re-initialization process is used to continue tracking when the tracking process stops because of not finding a proper isometric transformation. Additional key ROIs can be added to the key ROI buffer if necessary.

For each ROI being tracked, the ROI tracking module 1004 generates 3D coordinates and orientation angles for the ROI, which is provided to a downstream application 1006 for additional processing. Examples of such downstream applications include, but are not limited to, a gesture recognition application, an object recognition or detection application, and various other tracking applications and the like.

It is noted that tracking ROI based on key ROI buffer/database management procedure as described above does not use a model-based approach. In accordance with the present disclosure, key ROI buffer/database is dynamically rebuilt and active key ROI is dynamically switched. Tracking of the current ROI is provided by matching it to the active key ROI. Furthermore, a Viterbi-like optimal matching path search procedure is provided, and an optimal matching refinement procedure can be used to improve the ROI matching results.

It is contemplated that while the descriptions above referenced tracking of one or more rigid objects, experimental results also indicate that using the key frame based tracking method in accordance with the present disclosure is suitable for tracking 3D object that changes its form. For instance, the key frame based tracking method in accordance with the present disclosure is suitable for tracking hands even with finger movements. In addition, the key frame based tracking method in accordance with the present disclosure is suitable for tracking using 3D sensor with high level of noise and distortions and further noise-suppression technique that changes the shape of the 3D object (e.g., bilateral filtering conventionally used in ToF technology based sensors). It is noted that by adding ROIs to the key buffer as described above, the method in accordance with the present disclosure is able to manage the changing shapes of the object quite well and provide effective tracking for the object that changes its form.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. It is also understood that the ROI tracking system or some portion of the system may also be implemented as a hardware module or modules (using FPGA, ASIC or similar technology) to further improve/accelerate its performance.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for region of interest (ROI) tracking, the method comprising:
   storing a key ROI set in a key ROI buffer, the key ROI set including at least one key ROI;
   designating one of the key ROI in the key ROI set as an active key ROI;
   receiving a point cloud representing a particular ROI to be processed for tracking;
   establishing a correspondence between said particular ROI and said active key ROI;
   determining whether to switch said active key designation to another key ROI in the key ROI set and switching said active key designation accordingly;
   determining whether to modify the key ROI set; and
   modifying the key ROI set when it is determined to modify the key ROI set to keep the key ROI set relevant to an image frame being processed for ROI tracking.

2. The method of claim 1, wherein the key ROI set includes a plurality of key ROIs, and wherein the key ROI buffer also stores a plurality of isometric transformations established between the plurality of key ROIs.

3. The method of claim 1, wherein establishing a correspondence between said particular ROI and said active key ROI further comprises:
   finding an isometric transformation between said particular ROI and a previously processed ROI; and
   establishing the correspondence between said particular ROI and said active key ROI as a composition of the isometric transformation between said particular ROI and the previously processed ROI and a correspondence already established between the previously processed ROI and said active key ROI.

4. The method of claim 3, further comprising: refining the established correspondence.

5. The method of claim 1, wherein determining whether to switch said active key designation to another key ROI in the key ROI set further comprises:
   calculating a cloud-to-cloud distance between said particular ROI and said active key ROI;
   determining whether another key ROI in the key ROI set has a shorter could-to-cloud distance to said particular ROI; and
   switching said active key designation to this other key ROI in the key ROI set.

6. The method of claim 1, wherein determining whether to modify the key ROI set further comprises:
   determining whether the key ROI set is incomplete; and
   extending the key ROI set to include said particular ROI currently being processed.

7. The method of claim 6, wherein the key ROI set keeps a predetermined number of key ROIs, and one of the existing key ROIs is to be removed from the key ROI set when adding said particular ROI to the key ROI set causes the number of key ROIs in the key ROI set to exceed the predetermined number.

8. The method of claim 1, wherein determining whether to modify the key ROI set further comprises:
   determining whether to re-initialize ROI tracking;
   identifying another key ROI in the key ROI set that is more closely related to said particular ROI than said active key ROI; and
   extending the key ROI set to include said particular ROI and the isometric transformation established between said particular ROI and this other key ROI.

9. The method of claim 1, wherein establishing a correspondence between said particular ROI and said active key ROI further comprises:
   finding pair-wise isometric transformations between a plurality of previously processed ROIs within a predefined frame depth;
   based on the pair-wise isometric transformations obtained, finding isometric transformations between said particular ROI and each of the plurality of previously processed ROIs; and
   establishing the correspondence between said particular ROI and said active key ROI as a composition of the isometric transformation between said particular ROI and one of the previously processed ROIs and a correspondence already established between said one of the previously processed ROIs and said active key ROI.

10. A method for region of interest (ROI) tracking, the method comprising:
    initializing a key ROI buffer for storing a key ROI set having a plurality of key ROIs and a plurality of isometric transformations established between the plurality of key ROIs;
    designating one of the key ROI in the key ROI set as an active key ROI;
    receiving a point cloud representing a particular ROI to be processed for tracking;
    establishing a correspondence between said particular ROI and said active key ROI;
    calculating a cloud-to-cloud distance between said particular ROI and said active key ROI;
    determining whether another key ROI in the key ROI set has a shorter could-to-cloud distance to said particular ROI;
    switching said active key designation to this other key ROI in the key ROI set when this other key ROI has a shorter could-to-cloud distance to said particular ROI;
    determining whether to modify the key ROI set; and
    modifying the key ROI set when it is determined to modify the key ROI set to keep the key ROI set relevant to an image frame being processed for ROI tracking.

11. The method of claim 10, wherein establishing a correspondence between said particular ROI and said active key ROI further comprises:
    finding an isometric transformation between said particular ROI and a previously processed ROI; and
    establishing the correspondence between said particular ROI and said active key ROI as a composition of the isometric transformation between said particular ROI and the previously processed ROI and a correspondence already established between the previously processed ROI and said active key ROI.

12. The method of claim 11, further comprising: refining the established correspondence.

13. The method of claim 10, wherein determining whether to modify the key ROI set further comprises:
    determining whether the key ROI set is incomplete; and
    extending the key ROI set to include said particular ROI currently being processed.

14. The method of claim 13, wherein determining whether to modify the key ROI set further comprises:
    determining whether to re-initialize ROI tracking;
    identifying another key ROI in the key ROI set that is more closely related to said particular ROI than said active key ROI; and
    extending the key ROI set to include said particular ROI and the isometric transformation established between said particular ROI and this other key ROI.

15. The method of claim 14, wherein the key ROI set keeps a predetermined number of key ROIs, and one of the existing key ROIs is to be removed from the key ROI set when adding said particular ROI to the key ROI set causes the number of key ROIs in the key ROI set to exceed the predetermined number.

16. The method of claim 10, wherein establishing a correspondence between said particular ROI and said active key ROI further comprises:
    finding pair-wise isometric transformations between a plurality of previously processed ROIs within a predefined frame depth;
    based on the pair-wise isometric transformations obtained, finding isometric transformations between said particular ROI and each of the plurality of previously processed ROIs; and
    establishing the correspondence between said particular ROI and said active key ROI as a composition of the isometric transformation between said particular ROI and one of the previously processed ROIs and a correspondence already established between said one of the previously processed ROIs and said active key ROI.

17. A system for region of interest (ROI) tracking, the system comprising:
    a key ROI buffer, the key ROI buffer configured for storing a key ROI set having a plurality of key ROIs and a plurality of isometric transformations established between the plurality of key ROIs; and
    a ROI tracking module communicatively coupled with the key ROI buffer, the ROI tracking module configured for:
        designating one of the key ROI in the key ROI set as an active key ROI;
        receiving a point cloud representing a particular ROI to be processed for tracking;
        establishing a correspondence between said particular ROI and said active key ROI;
        calculating a cloud-to-cloud distance between said particular ROI and said active key ROI;
        determining whether another key ROI in the key ROI set has a shorter could-to-cloud distance to said particular ROI;
        switching said active key designation to this other key ROI in the key ROI set when this other key ROI has a shorter could-to-cloud distance to said particular ROI; and
        determining whether to modify the key ROI set and modifying the key ROI set accordingly.

18. The system of claim 17, wherein establishing a correspondence between said particular ROI and said active key ROI further comprises:
    finding an isometric transformation between said particular ROI and a previously processed ROI; and
    establishing the correspondence between said particular ROI and said active key ROI as a composition of the isometric transformation between said particular ROI and the previously processed ROI and a correspondence already established between the previously processed ROI and said active key ROI.

19. The system of claim 17, wherein establishing a correspondence between said particular ROI and said active key ROI further comprises:
   finding pair-wise isometric transformations between a plurality of previously processed ROIs within a predefined frame depth;
   based on the pair-wise isometric transformations obtained, finding isometric transformations between said particular ROI and each of the plurality of previously processed ROIs; and
   establishing the correspondence between said particular ROI and said active key ROI as a composition of the isometric transformation between said particular ROI and one of the previously processed ROIs and a correspondence already established between said one of the previously processed ROIs and said active key ROI.

20. The system of claim 17, wherein determining whether to modify the key ROI set further comprises:
   determining whether the key ROI set is incomplete or whether to re-initialize ROI tracking;
   when the key ROI set is incomplete, extending the key ROI set to include said particular ROI currently being processed;
   when ROI tracking needs to be re-initialized, identifying another key ROI in the key ROI set that is more closely related to said particular ROI than said active key ROI, and extending the key ROI set to include said particular ROI and the isometric transformation established between said particular ROI and this other key ROI.

* * * * *